United States Patent
Wakisaka et al.

[11] Patent Number: 5,917,944
[45] Date of Patent: Jun. 29, 1999

[54] CHARACTER RECOGNIZING AND TRANSLATING SYSTEM AND VOICE RECOGNIZING AND TRANSLATING SYSTEM

[75] Inventors: Shinji Wakisaka, Ebina; Hiroko Sato, Yokohama, both of Japan

[73] Assignee: Hitachi, Ltd., Tokyo, Japan

[21] Appl. No.: 08/751,535

[22] Filed: Nov. 15, 1996

[30] Foreign Application Priority Data

Nov. 15, 1995 [JP] Japan .................................. 7-296920
Nov. 27, 1995 [JP] Japan .................................. 7-307480

[51] Int. Cl.$^6$ .................................................. G06K 9/46
[52] U.S. Cl. ........................ 382/190; 382/203; 382/229; 395/752; 395/758
[58] Field of Search .................................. 382/203, 190, 382/187, 229, 177; 369/54, 32; 380/1; 395/751, 752, 758

[56] References Cited

U.S. PATENT DOCUMENTS

| | | | |
|---|---|---|---|
| 3,992,697 | 11/1976 | Knab et al. | 340/146.3 |
| 4,180,799 | 12/1979 | Smith | 340/146.3 |
| 4,610,025 | 9/1986 | Blum et al. | 382/177 |
| 5,063,508 | 11/1991 | Yamada et al. | 364/419 |
| 5,233,681 | 8/1993 | Bahl et al. | 395/2 |

FOREIGN PATENT DOCUMENTS

| | | | |
|---|---|---|---|
| 0586714 | 3/1994 | European Pat. Off. | G10L 9/10 |
| 0660300 | 6/1995 | European Pat. Off. | G10L 5/06 |
| 3-87976 | 4/1991 | Japan | G06F 15/38 |
| 5-35776 | 2/1993 | Japan | G06F 15/38 |

*Primary Examiner*—Jose L. Couso
*Assistant Examiner*—Anh Hong Do
*Attorney, Agent, or Firm*—Evenson, McKeown, Edwards & Lenahan, P.L.L.C.

[57] ABSTRACT

A study system of a character recognizing and translating system is provided with a character data base for storing character data representing characters contained in a sensed image; a character shape analysis unit for analyzing the shape of a character to extract the features of character constituting elements constituting the character; and, a mask learning unit for generating sample mask data of the character constituting elements on the basis of the analysis result of the character shape analysis unit. A recognition system of the character recognizing and translating system is provided with a collating unit for collating the character data of a character to be recognized with the sample mask data so as to recognize the character.

14 Claims, 13 Drawing Sheets

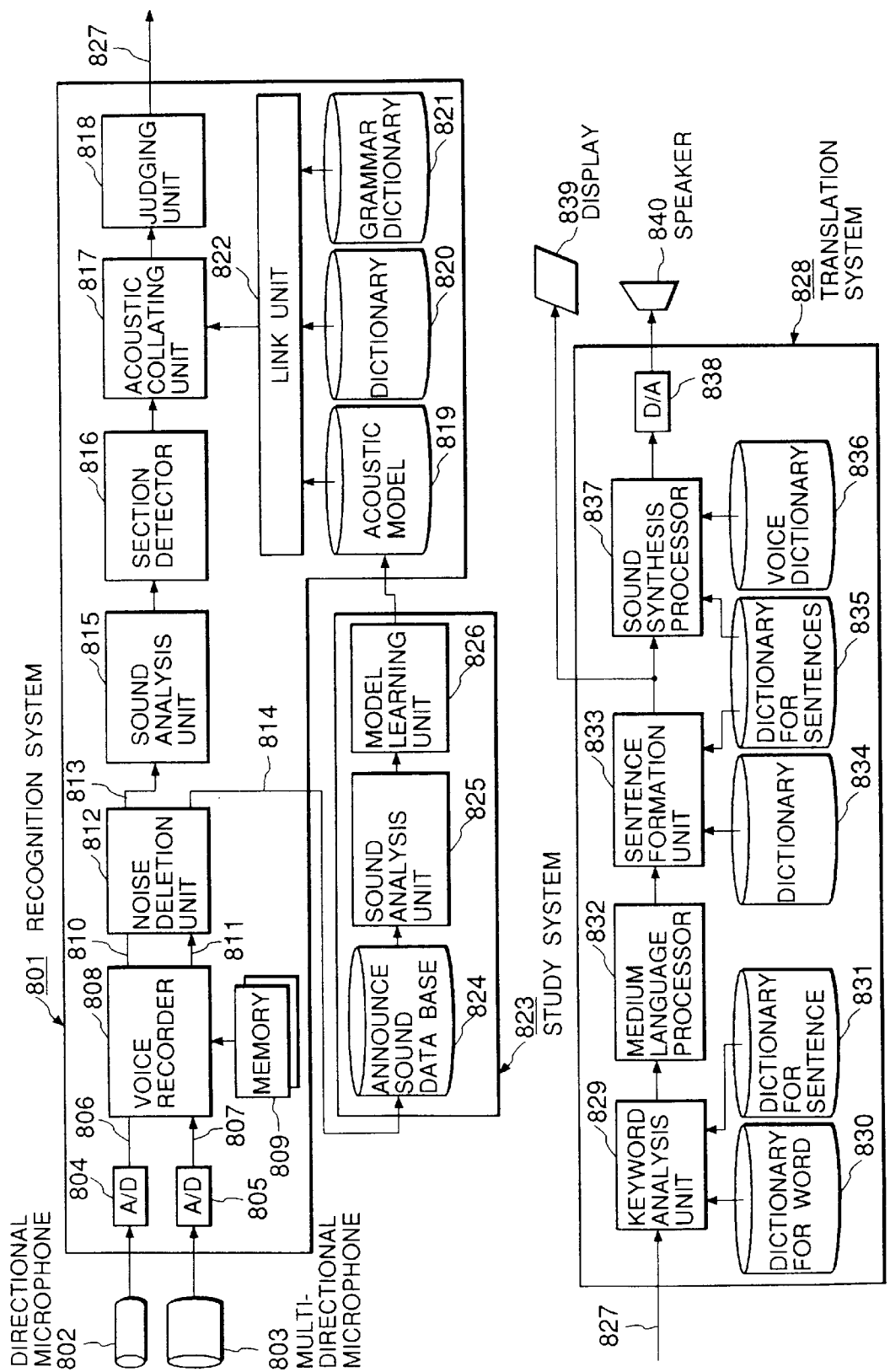

CHARACTER RECOGNIZING AND TRANSLATING SYSTEM AND VOICE RECOGNIZING AND TRANSLATING SYSTEM

BACKGROUND OF THE INVENTION

1. Field of the Invention

The present invention relates to a character recognizing and translating system which is suitable for use as a portable translating machine or the like, and more particularly to a character recognizing and translating system for taking, as camera image data, characters which are written on sightseeing guide boards, building name plates, signboards, sightseeing guide pamphlets, menus of restaurants, etc. to which travelers often refer in overseas travel places, for example so as to recognize the characters. The character recognizing and translating system is not restricted to any particular shape or size of character, nor to any particular languages, and it is suitable for use in recognizing and translating various characters written in various languages which are taken in or imaged as camera image data. Furthermore, the present invention relates to a voice recognizing and translating system which is suitable for use as a portable translating machine, and more particularly as a voice recognizing and translating system for picking up (taking) or recording various types of voices or other aural information which are announced in an air port lobby, a train station, in an airplane, a vehicle, at a sightseeing location, etc., as well as surrounding conversational speech, and voices and announcements at lectures, etc., so as to recognize and translate the so taken-in or recorded voices.

2. Description of Related Art

Recently, a portable liquid crystal digital camera has been developed for enabling a user to view just-photographed still image information at the place where the photographs were taken, record the still image information in a recording medium, display the image information on a large-scale screen monitor, print the image information with a printer, etc.

Japanese Laid-open Patent Application No. Hei-3-87976 discloses a character recognizing and translating machine for an electronic still camera, which is connected to an electronic still camera such as the above-described type of liquid crystal digital camera or the like, to recognize character information in recorded images and further to translate the recognized result. This machine is designed so as to receive character information contained in object images from the electronic still camera and recognize and translate characters contained in the character information. More specifically, according to the character recognizing and translating machine, video signals from the electronic still camera are converted to signals which are suitable for character recognition and translation processing, and are then subjected to a series of general information processing steps such as character area extraction processing based on an edge extraction method, background deletion processing, character arrangement slant correction processing, character recognition processing based on a pattern matching method, machine translation processing, etc.

However, according to the conventional character recognizing and translating device as described above, it has been very difficult to recognize and translate characters written on sightseeing guide boards, building name plates, restaurant menus, sightseeing guide pamphlets, etc. to which travelers often refer in overseas travel places. This is because it frequently occurs that characters cannot be accurately recognized by merely applying a pattern matching method using only a character reference pattern to calligraphic characters which are written in various writing styles in overseas places.

On the other hand, following the recent rapid increase in the number of overseas travelers, portable translating machines having fixed forms of conversion patterns with voice recognition have been developed to overcome the difficulties of communication among people of various nationality (the so-called language barrier). These portable translating machines utilize a reproduction system in which sentences used in various types of conversations are registered as voice data in advance and a desired sentence is selected in accordance with a given situation. According to this reproduction system, a person with which a user is conversing (hereinafter referred to as a "person in conversation") is allowed to one-sidedly hear, in his native language, a question or request which the user wishes to make. However, the speech of the person cannot be translated by this machine. Therefore, there has been proposed another device for recognizing a user's voice in which the spoken words are input through a microphone, the voice is translated into a predetermined language and is then outputted, as disclosed in Japanese Laid-open Patent Application No. Hei-5-35776.

According to this device, voice data which is input through the microphone is converted to a digital signal and divided to be analyzed, and then the result of analysis is compared with a standard voice pattern stored in a voice recognition dictionary to perform voice recognition. Furthermore, according to this device, translated words corresponding to a recognized voice are read in from a memory card for translated word data, converted to a signals and then output to a speaker. The memory card for translated word data comprises a ROM card or the like, and has voice data stored therein. By exchanging the memory card with one for another language, voice translation can be achieved in plural languages. The voice recognition dictionary comprises a RAM or the like, and has standard voice patterns corresponding to the user's particular pronunciation prerecorded therein.

In the above-described portable voice translating machine disclosed in the above publication, the voice of the user can be recognized. However, its function is limited to that of the portable translating machine using fixed conversation patterns with voices as described above. That is, it allows a person in conversion to one-sidedly hear a user's question or request in the person's native language. However, it cannot recognize and translate the natural conversation voice of an unspecified person, and thus the user cannot understand his speech. When the user is in conversation with a person who speaks a language which the user cannot speak, it is more important to translate the speech of the person in conversation than the speech of the user.

Furthermore, during overseas travel, a traveler has problems in that he cannot understand voice announcements which are made in an air-port lobby, a train station, in an airplane, a vehicle, at a sightseeing location, etc., nor can he understand normal surrounding conversational speech, voices and announcements at lectures, etc. Particularly for the voice recognition of voice announcements in an air-port lobby, a train station, in an-air plane, a vehicle, at a sightseeing location, etc., reduction in recognition efficiency of voice recognition when there is background noise is a critical problem.

Therefore, an object of the present invention is to provide a character recognizing and translating system which is not restricted by the shape or size of characters nor by any difference in language, and which can recognize and translate various characters written in various languages which are sensed as camera image data. Furthermore, another object of the present invention is to provide a voice recognizing and translating system for reliably recognizing and translating various types of continuous voices or announcements when there is background noise such as in an air-port lobby, a train station, in an air-plane, in a vehicle, at a sightseeing location, etc.

SUMMARY OF THE INVENTION

In order to attain the above-described objects, according to a first aspect of the present invention, a character recognizing and translating system for sensing characters written on a guide board, a building name plate, a restaurant menu, sightseeing guide pamphlets or the like, using a camera and recognizing the characters and translating words or sentences comprising the recognized characters, includes: a character data base for accumulating character data representing characters contained in a sensed image; a character-shape analysis unit for analyzing the shape of a character on the basis of the character data in the character data base to extract the features of the character constituent elements constituting the character; a mask learning unit for creating sample mask data of the character constituent elements on the basis of the analysis result of the character-shape analysis unit; a character collating unit for collating the character data of characters which are to be recognized and which are contained in a newly-taken image with the sample mask data of character constituent elements to thereby recognize the characters; and, a translation unit for translating a word or sentence which comprises the recognized characters which are recognized by the character collating unit.

In the character recognizing and translating system as described above, the character-shape analysis unit is preferably designed to divide binary data of m×n dots (pixels) from the character data in the character data base, detect "1" or "0" for each pixel while incrementing n, divide the data into picture-element areas of m×n1 (n1≦n), m×n2 (n2≦n), . . . , m×ni (ni≦n) which contain the features of the characters, and analyze a weight coefficient representing character identification and/or an attribute representing the start, link and end of the character for every pixel area.

In the character recognizing and translating machine as described above, it is more preferable that the mask learning unit adds each of the picture-element areas of m×n1 (n1≦n), m×n2 (n2≦n), . . . , m×nj (nj≦n) containing the features of the characters with a weight coefficient representing character identification and/or attributes representing the start, link and end of the character for every pixel area so as to create sample mask data.

In the character recognizing and translating machine as described above, it is more preferable that the character collating unit divides out binary data of m×n dots from the character data, detects "1" or "0" for each picture element while incrementing n, divides the data into picture-element areas of m×n1 (n1≦n), m×n2 (n2≦n), . . . , m×ni (ni≦n), which contain the features of the characters, and collates the data of the picture-element area and the sample mask data.

In the character recognizing and translating machine as described above, it is more preferable that the system further includes a sample mask memory for storing sample mask data obtained by the mask learning unit, the sample mask memory storing therein sample mask data having n1,n2, . . . ,nj elements which are different for each different character.

In the character recognizing and translating machine as described above, it is more preferable that the system further includes an image sensing (pickup) unit for sensing an image containing characters, and a character array specifying unit for specifying a character array containing words or sentences to be recognized on the basis of the image data obtained by the sensed image.

In the character recognizing and translating machine as described above, it is more preferable that the character array specifying unit specifies at least one area of m×n dots at any position.

Furthermore, it is more preferable that when the obtained character array contains laterally-written characters, the character collating unit obtains a picture-element area in the width direction of the characters while incrementing n which is in connection with n dots in the width direction of the characters so as to collate the data of the picture-element area with the sample mask data. Furthermore, if or when the obtained character array contains longitudinally-written characters, the character collating unit obtains a picture-element area in the height direction of the characters while incrementing n which is in connection with n dots in the height direction of the characters so as to collate the data of the picture-element area with the sample mask data.

Further, according to the present invention, the character recognizing and translating system preferably comprises a stationary-mount-type information equipment having an external storage device, and a portable-type information equipment which is detachably linked to the stationary-mount-type information equipment, and at least the character data base is provided in the external storage device of the stationary-mount-type information equipment while the other constituent parts are provided in the portable type information equipment. Particularly, the character data base, the character-shape analysis unit and the mask learning unit are provided in the stationary-mount-type information equipment while the other constituent parts are provided in the portable-type information equipment.

According to the character recognizing and translating system thus constructed, those characters which are written on sightseeing guide boards, building name plates, signboards, sightseeing guide pamphlets, menus of restaurants, etc. to which travelers often refer in overseas travel places, can be sensed as image data so as to recognize and translate the characters contained therein, and the characters of various languages thus sensed as image data can be properly recognized and translated with no restriction in the shape or size of characters and languages.

According to a second aspect of the present invention, a voice translating and recognizing system for recognizing detected voices and translating the voices into words or sentences, includes: a voice memory for storing voice data representing the detected voice; a noise deletion unit for removing or deleting data corresponding to noise; a sound data base for storing the data from which the noise has been removed by the noise deletion unit; a first voice analysis unit for extracting sound features corresponding to the voice data accumulated in the sound data base; a model learning unit for creating an acoustic model on the basis of the analysis result of the first voice analysis unit; an acoustic model storing unit for storing the acoustic model, a second voice analysis unit for extracting sound features of newly-detected voice on the basis of the data obtained by removing data representing noise from the voice data corresponding to the newly-detected voice, a voice collating unit for collating the voice data obtained by the second voice analysis unit with the data of the acoustic model stored in the acoustic model storing unit so as to recognize the voice; and, a translation unit for translating the words or sentences constituting the voice which is recognized by the voice collating unit.

In the voice recognizing and translating system as described above, it is preferable that the memory be designed to store the first voice data corresponding to a first voice in which surrounding noise is superposed on a voice to be recognized and translated, and the second voice data corresponding to a second voice comprising the surrounding noise.

Furthermore, in the voice recognizing and translating system as described above, it is preferable that the noise deletion unit compares the first voice spectral data of the first voice data with the second voice spectral data of the second voice data to obtain spectral data corresponding to the data from which noise is removed.

In the voice recognizing and translating system, it is further preferable that the sound data base be designed to store the first spectral data and the second spectral data therein while linking these data to each other.

In the voice recognizing and translating system, it is further preferable that before inputting the voice to be recognized and translated, the acoustic collating unit collates the noise spectral data of the surrounding noise obtained at the same place as the voice with the data of a noise acoustic model obtained on the basis of the second spectral data so as to recognize the type of noise, and further collates the voice data of the voice to be recognized and translated with the data of an acoustic model of the first voice data which is determined on the basis of the type of the noise to recognize the voice.

In the voice recognizing and translating system as described above, it is further preferable that a translation result obtained by the translation unit be output at least as characters by a display device, and that an original language text comprising words or sentences before translation and a translated language text comprising words or sentences after translation be displayed on the screen of the display device. Particularly, the translation result preferably contains at least one of information corresponding to a translation rate representing the translation precision or information corresponding to the language type.

In the voice recognizing and translating system as described above, it is further preferable that the voice recognizing and translating system comprises a stationary-mount-type information equipment having an external storage device, and a portable-type information equipment which is detachably connected to the stationary-mount-type information equipment, and at least the sound data base is provided to the external storage device of the stationary-mount-type information equipment while the other parts are provided to the portable-type information equipment. Particularly, it is more preferable that the sound data base, the first voice analysis unit and the model learning unit are provided to the stationary-mount type information equipment while the other parts are provided to the portable-type information equipment.

According to the voice recognizing and translating system as described above, various types of voices which are announced in an air-port lobby, a train station, an airplane, a vehicle, a sightseeing location, etc., to which travelers refer in overseas travel places, as well as surrounding conversation speech, and voices or announcements at lectures, etc., can be appropriately recognized even under a noisy environment. Furthermore, the words or sentences which constitute recognized voice are recognized by a dictionary or grammar dictionary. In addition, words or sentences which serve as keywords are analyzed from the recognized words or sentences, and translated.

Accordingly, the voice of any unspecified speaker can be clearly recognized even under various noisy environments such as in an air port lobby, a train station, an airplane, a vehicle, etc., and at sightseeing locations.

BRIEF DESCRIPTION OF THE DRAWINGS

FIG. 8 is a block diagram showing the construction of the voice recognizing and translating system according to a second embodiment of the present invention;

DETAILED DESCRIPTION OF THE PREFERRED EMBODIMENTS

Preferred embodiments according to the present invention will be described hereunder with reference to the accompanying drawings.

Figure 1:
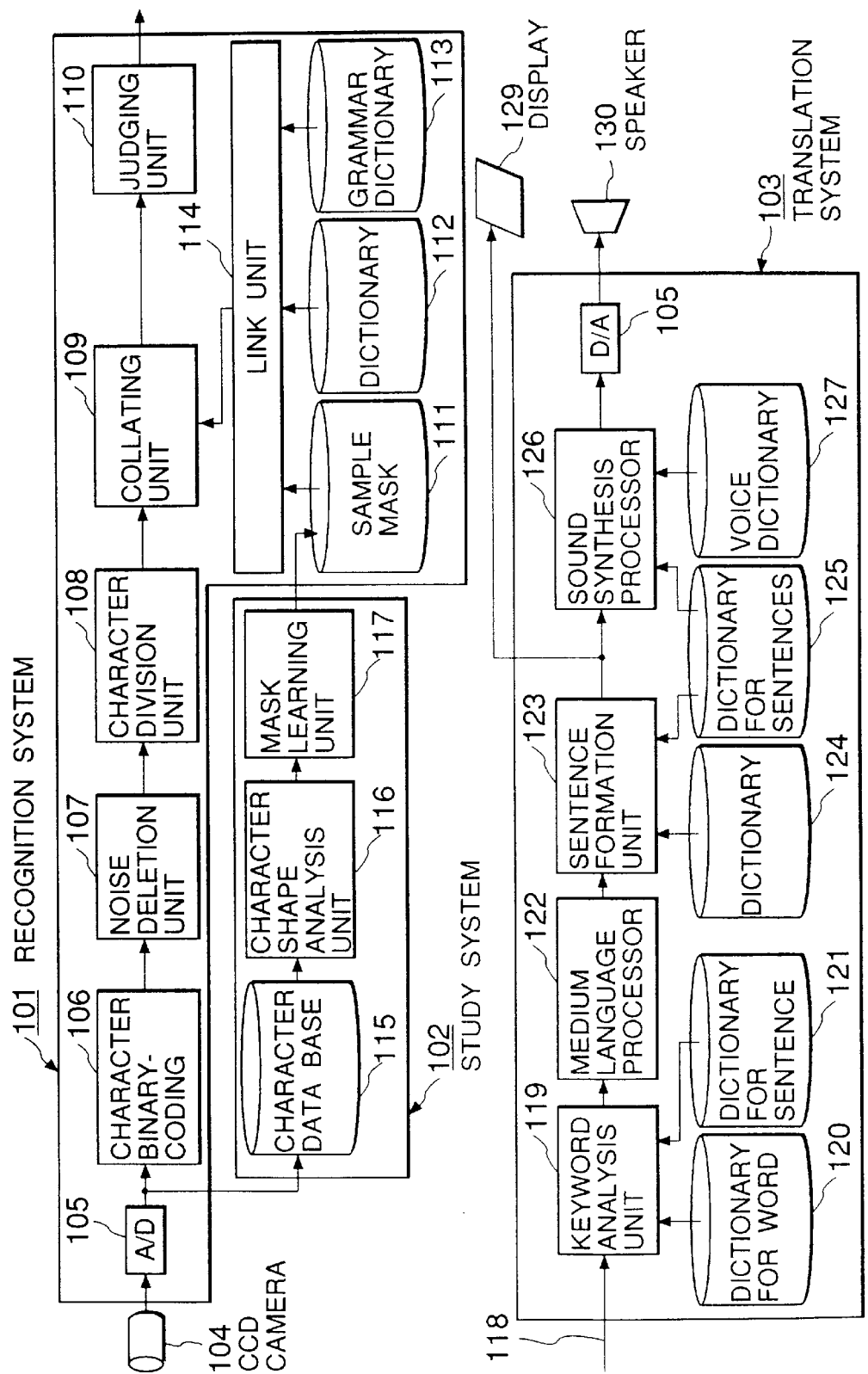
FIG. 1 is a block diagram showing the construction of a character recognizing and translating system according to a first embodiment of the present invention.

In FIG. 1, reference numeral 101 represents a recognition system for performing character recognition, reference numeral 102 represents a study system for generating sample mask data required for character recognition, and reference numeral 103 represents a translation system for receiving a recognition result from the recognition system for analyzing sentences on the basis of keywords and translating them. Reference numeral 104 represents a camera having a CCD or the like for sensing as image data characters which are written on guide boards, building name plates, menus of restaurants, sightseeing guide pamphlets, etc. Here, in order to ensure the permitted minimum resolution per character which is required for character recognition, an image analysis is performed by using a high-resolution camera or by using plural cameras. Accordingly, the resolution of characters in a character specifying area as described later which are displayed on a liquid crystal display device or the like is clearly different from the resolution of character image data which are taken for recognition processing, and the latter resolution is higher than the former resolution. Reference numeral 129 represents a display comprising a light emitting diode (LED), and reference numeral 130 represents a speaker,. The processing result of the translation system 103 is output as an image and as a voice containing sentences from the display 129 and the speaker 130, respectively.

In the recognition system 101, reference numeral 105 represents an A/D converter, reference numeral 106 represents a character digitizing (binary) processing unit, reference numeral 107 represents a noise deletion (removing) unit, reference numeral 108 represents a character division unit, reference numeral 109 represents a collating unit, reference numeral 110 represents a judgment unit, reference numeral 111 represents a sample mask storing unit, reference numeral 112 represents a dictionary, reference numeral 113 represents a grammar dictionary, and reference numeral 114 represents a linking unit.

Furthermore, in the study system 102, reference numeral 115 represents a large-scale character data base, reference numeral 116 represents a character shape analysis unit, and reference numeral 117 represents a mask learning unit.

In the translation system 103, reference numeral 119 represents a keyword analysis unit, reference numeral 120 represents a word meaning dictionary (dictionary for word), reference numeral 122 represents a medium language processor, reference numeral 123 represents a sentence formation unit, reference numeral 124 represents a dictionary, reference numeral 125 represents a sentence structure example dictionary (dictionary for sentences), reference numeral 126 represents a sound synthesis processor, reference numeral 127 represents a sound dictionary, and reference numeral 128 represents a D/A converter.

In the study system 102 thus constructed, still image data containing character arrays which are photographed (sensed) by a camera (CCD camera) 104 and then converted from analog signals to digital signals, are accumulated and stored in the large-scale character data base 115. On the basis of the still image data stored in the large-scale character data base 115, the character shape analysis unit 116 performs binary (digitizing) processing of digitizing the image data containing characters, extraction processing of extracting a character area from a background, including noise removing processing, and extraction processing of analyzing the shape of a character so as to extract the features of the character constituting elements which constitute the character.

Subsequently, the mask learning unit 117 receives the feature extraction result of a character from the character shape analysis unit 116, and generates sample mask data on the basis of the feature extraction result. The sample mask data generated by the mask learning unit 117 are stored in the sample mask storing unit 111 in the recognition system 101.

The reading-in of image character data into the large-scale character data base may be performed at any time. Nevertheless, it is preferable that processing by the study system 102 has been finished before the read-in operation as described above if there is extra or sufficient time. Furthermore, it is desirable to obtain the image character data corresponding to characters of plural different writing styles for each publicly-know character set (each character code) in advance.

Like the sample mask storing unit 111, the recognition system 101 is provided with the dictionary 112 and the grammar dictionary 113 which are required to recognize words or sentences. For example, in a case where characters which are sensed by a camera are written in French and these characters are to be translated into Japanese, the sample mask storing unit 111, the dictionary 112 and the grammar dictionary 113 are designed to correspond to French. It is further preferable that a large-capacity storing medium such as an exchangeable IC (Integrated Circuit) card, CD-ROM (Compact Disc Read Only Memory) or the like is used for the sample mask storing unit 111, the dictionary 112 and the grammar dictionary 113 so that the system of the present invention is usable in a multi-lingual mode.

In the case where the character (document) recognizing and translating system is applied to a device having a restriction in its hardware scale (size) such as a portable translating machine, the study system 102 may be installed in a personal computer while the other parts are installed in a portable translating machine as described later. The processing of the study system 102 will be described later.

In the recognition system 101, the image data which are sensed by the CCD camera 104 and then converted to digital signals by the A/D converter 105 are subjected to binary processing by the character binary processor 106. At this time, the binary image data are normalized by a resolution conversion method, and converted to image data of m×n picture elements (dots) containing a character array. Subsequently, the image data are subjected to noise removing processing so as to cut out background noise and all other noise, leaving only the character data. Thereafter, the character division unit 108 divides-out a character area from the character array of m×n picture elements (dots) while incrementing n (that is, increasing n by every picture element (dot)). These divided-out character areas are collated, as character constituting elements constituting a character, with the sample mask data stored in the sample mask storing unit 111 by the collating unit 109.

Subsequently, a character is constructed by respectively collated character constituting elements, and then the character thus constructed is recognized. Further, the characters thus recognized are linked to one another in the link unit 114 by referring to the dictionary 112 and the grammar dictionary 113, and then the sequential characters which are linked by the link unit 114 are collated to recognize a word or sentence by the judging unit 110. In FIG. 1, reference numeral 118 represents coded data which are output from the recognition system 101 and represents a word or sentence. The detailed processing of the collating unit 109 will be described.

In the translation system 103, the coded data 118 which represent a word or sentence and which are output from the recognition system 101 are analyzed by the keyword analysis unit 119 to judge whether the word or sentence is an effective keyword for translation, and the meaning of such a word or sentence is recognized on the basis of the keyword. Furthermore, a medium language which represents only the meaning of the sentence and that is not dependent on any particular spoken language of any country is generated in the medium language processor 122.

The keyboard analysis unit 119 is connected to a word meaning dictionary (dictionary for word) 120 and a sentence structure meaning dictionary (dictionary for sentence) 121. For example, when characters which are sensed by the CCD camera 104 are written in French and they are required to be translated into Japanese, the dictionary for word 120 and the dictionary for sentence 121 are designed to correspond to French. In order to use this system in a multi-lingual mode, a large-capacity storing medium such as an exchangeable IC card or CD-ROM is preferably used for the dictionary for word 120 and the dictionary for sentence 121.

The medium language which is created in the medium language processor 122 is translated into sentences written in a desired language. The sentence formation unit 123 is connected to the dictionary 124 and the dictionary for sentences 125 which correspond to, e.g., Japanese. The translated sentence is displayed on the screen of the display 129. The translated sentence is further converted to a digital voice in the sound synthesis processor 126, passed through the D/A converter 128 for converting the digital signals to analog signals, and then output as a voice from the speaker 130.

The sound synthesis processor 126 is connected to the dictionary for sentences 125 and a sound dictionary 127 which correspond to, e.g., Japanese. In order to use this system in a multilingual mode, a large-capacity storing medium such as an exchangeable IC card, CD-ROM or the like is preferably used for the dictionary 124, the dictionary for sentences 125 and the sound dictionary 127.

Each processing step shown by the block diagram in FIG. 1 may be achieved by a system which comprises plural LSI (large-scale integrated) circuits and a memory, or by one or more system-on-chips, which are formed on a semiconductor device.

Next, the detailed processing of the study system 102 will be described.

Figure 2:
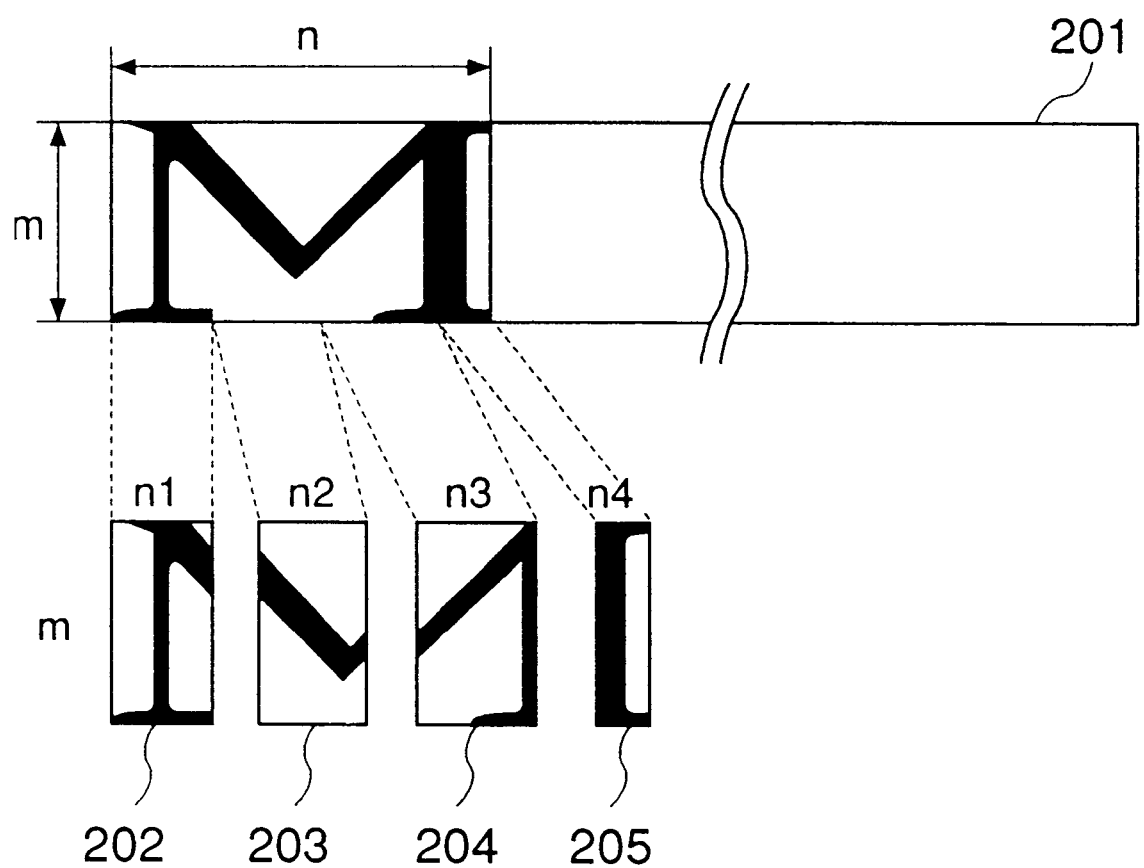
FIG. 2 is a diagram showing a method of generating sample mask data according to the first embodiment of the present invention.
Figure 3:
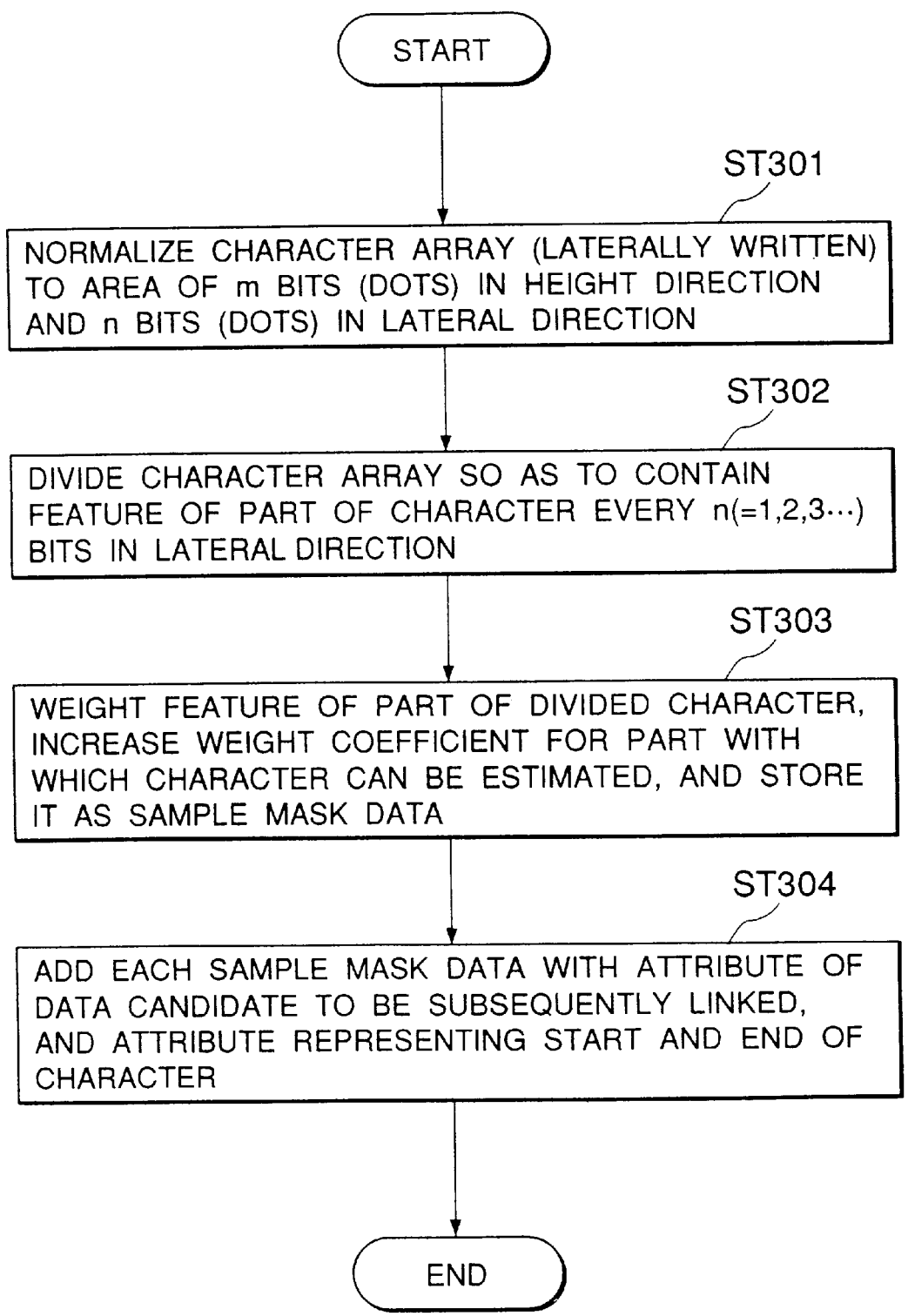
FIG. 3 is a flowchart for the sample mask data generating method in the first embodiment.

FIG. 2 shows a method of generating sample mask data in the study system 102, and FIG. 3 is a flowchart showing a sample mask data generating process.

The character shape analysis unit 116 performs binary processing on image data containing characters which are supplied from the large-scale character data base stored with still image data containing a character array which have been converted to digital signals. The binary image data are normalized by the resolution conversion method, and converted to image data 201 (FIG. 2) of m×n picture elements (dots or pixels) of a character array (written laterally) (step ST301). Further, the extraction processing of extracting a character area from the background, which contains the noise removing processing, is performed to analyze the shape of each character; for example, to extract the features of character constituting elements which constitute a character "M" of m×n picture elements (dots) shown in FIG. 2. In order to perform this processing, "1" (black) or "0" (white) is detected for the m×n picture elements while incrementing n (=1, 2, 3, . . . ) every picture element (dots) in the lateral direction, and the character area of m×n picture elements is divided into image areas (202 to 205 in FIG. 2) of character constituting elements m×n1(n1≦n), m×n2 (n2≦n), m×n3 (n3≦n), m×n4 (n4≦n), each character constituting element containing such a feature as the outline of a character or the like. At the same time, a weighting coefficient representing identification of a character (i.e., representing what the character concerned is) and attributes representing the start, the linkage and the end of the character are analyzed (step ST302). Subsequently, the mask learning unit 117 weighs the features of the parts of a divided character. If the type of character is estimated on the basis of only a part of the character, the weighting coefficient of the part is set to a large value (step ST303). Further, the attribute representing the start, the linkage and the end of the character is added to generate sample mask data (step ST304).

Next, the detailed processing of the collating unit 109 in the recognition system 101 will be described.

Figure 4:
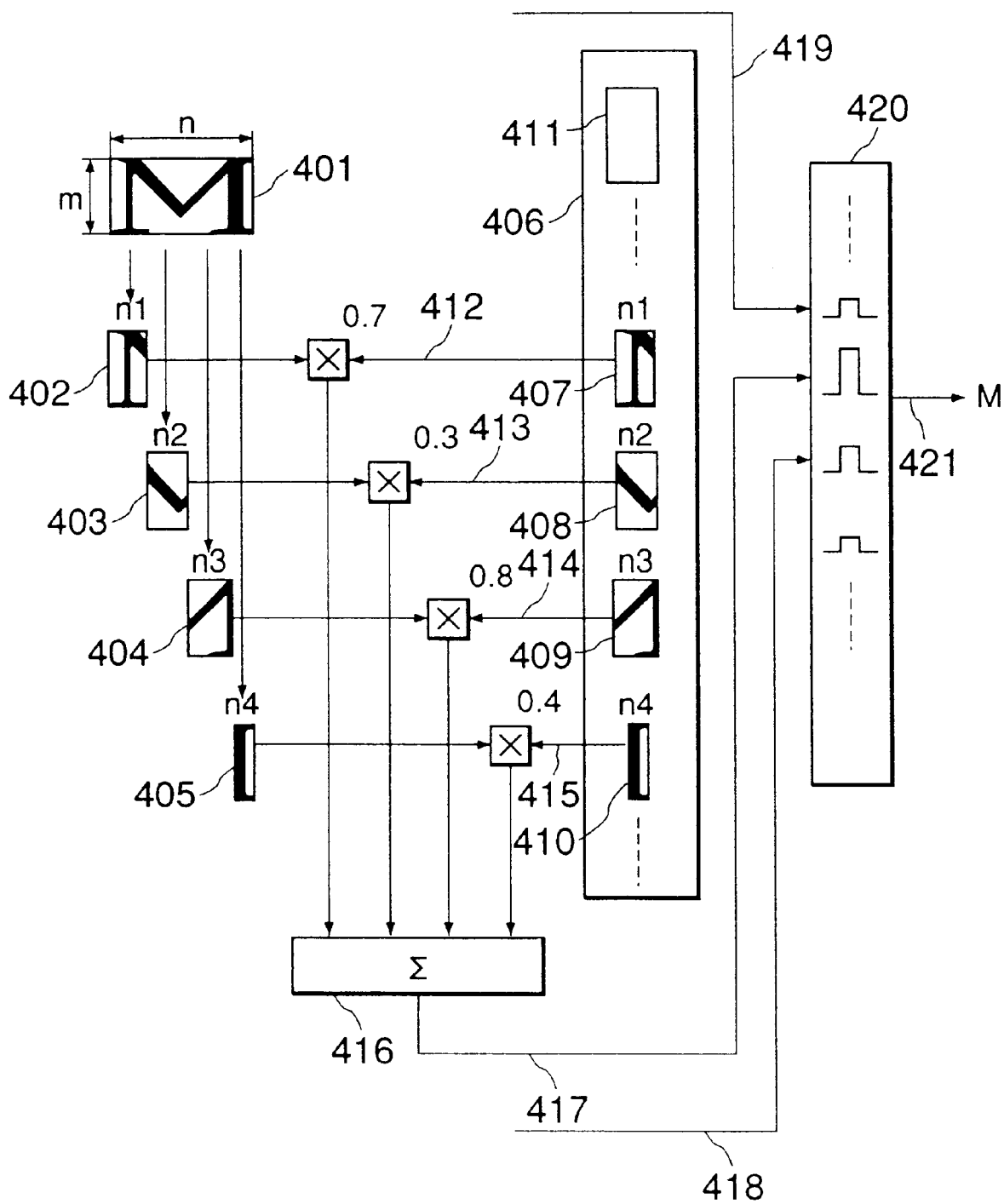
FIG. 4 is a diagram showing a sample mask data collating method according to the first embodiment of the present invention.
Figure 5:
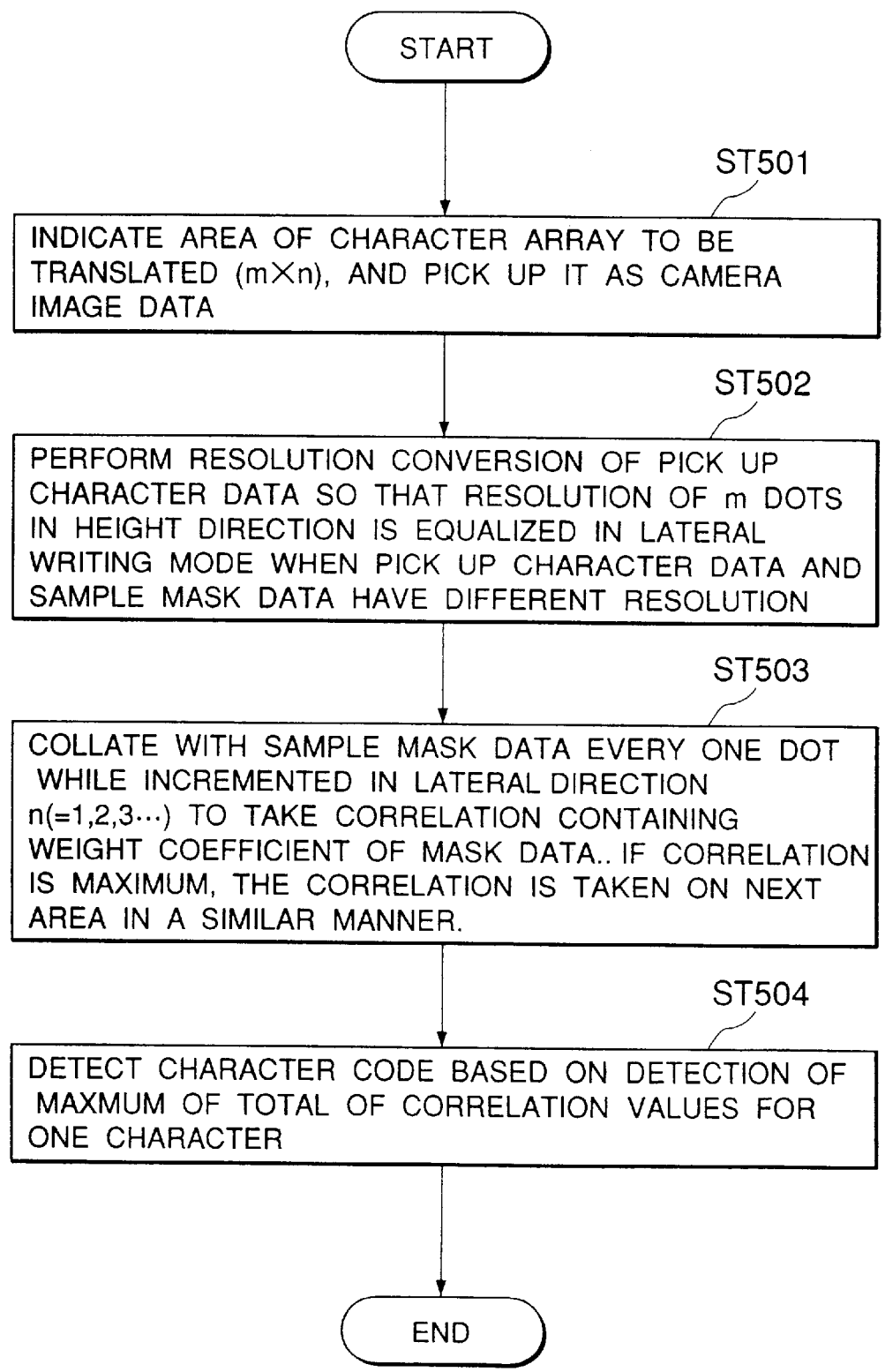
FIG. 5 is a flowchart for the sample mask data collating method of the first embodiment of the present invention.

FIG. 4 shows an actual case where character data which are actually sensed as a camera image in an overseas travel place are collated with sample mask data in a portable translating machine to recognize a character "M". FIG. 5 is a flowchart showing a character collating process shown in FIG. 4.

First, m×n picture elements of a character specifying area is specified for a character to be recognized and translated, and they are sensed as camera image data (step ST501). Reference numeral 401 in FIG. 4 represents a character "M" corresponding to the picture elements (m×n) which are sensed as the camera image data. At this time, in the character binary processor 106, if the resolution of the sensed character data is different from that of the sample mask data, resolution conversion is performed on the sensed character data to normalize the character data so that the resolution of m dots in the height direction of the character is made equal between the sensed character data and the sample mask data in a case where the character is written in a lateral writing style (step ST502). With respect to the resolution of n dots in the width direction, it is preferable to prepare plural sample masks having different values of n.

Subsequently, a character area is successively generated from the character data 401 by incrementing the value of n (=1, 2, 3, . . . ) every picture element (dot) in the lateral direction, and the data of these areas thus generated are collated with the sample mask data to make a correlation, containing the weighting coefficients of the sample mask data, between the character data and the sample mask data.

If the correlation is a maximum, a next picture-element area is generated to take a correlation in the same manner as described above (step ST503). For example, the correlation between the picture-element areas (402 to 405 in FIG. 4) of m×n1 (n1≦n), m×n2 (n2≦n), m×n3 (n3≦n), m×n4 (n4≦n) and the sample mask data (407 to 410 in FIG. 4) is assumed to be best. Here, reference numeral 411 in FIG. 4 represents sample mask data representing character constituting elements of another character. Reference numerals 412, 413, 414 and 415 represent image data containing the weighting coefficients of 0.7, 0.3, 0.8 and 0.4 respectively.

As described above, the sample mask data is added with the attribute of the start, the linkage and the end of the character, whereby a time for searching sample mask data from the memory can be shortened. Finally, a character code "M" 421 is selected from plural character codes 420 as a target character code on the basis of the sample mask data which provides the maximum sum of the correlation values (step ST504). In FIG. 4, reference numerals 418 and 419 represent signals which indicate other sample mask data each providing the maximum sum of the correlation values.

Figure 6A:
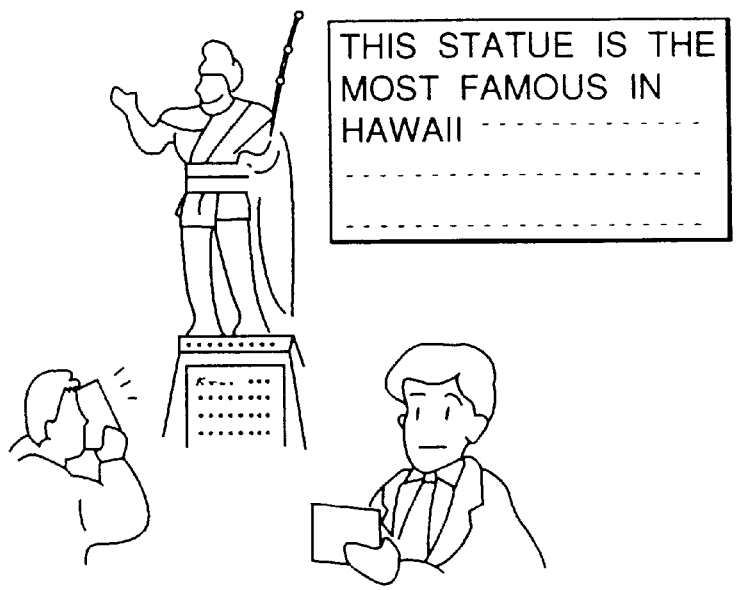
FIGS. 6A and 6B show a portable translating machine to which the character recognizing and translating system of the first embodiment is applied.
Figure 6B:
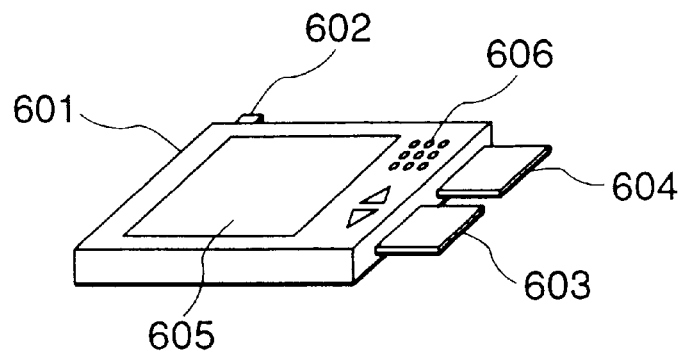

FIG. 6A shows a portable translating machine to which the image character translation system of the present invention is applied, and FIG. 6B shows an external view of the machine.

In FIG. 6A, an explanation sentence which is written in a foreign language under a bronze statue is recognized and translated by the system. A user specifies the words or sentences he wants to know within a rectangular area while viewing them through a viewfinder of the portable translating machine. The specified character array is immediately subjected to character recognition. For example, when the user is a Japanese-speaking person, the character array is translated into Japanese.

In FIG. 6B, reference numeral 601 represents the main body of the portable translating machine, and reference numeral 602 represents a CCD camera for taking a character image. Reference numerals 603 and 604 represent IC cards. In the IC card 603 data are stored for constructing the sample mask storing unit 111, the dictionary 112, the grammar dictionary 113, the dictionary for word 120 and the dictionary for sentence 121 to perform the character recognition and translation. Further, in the IC card 604 data are stored for constructing the dictionary 124, the dictionary for sentences 125 and the sound dictionary 127 to perform the character recognition and translation.

Reference numeral 605 represents a liquid crystal display for displaying a character specifying area to specify the character array of a word or sentence for which the character recognition and translation is desired, and a character recognition and translation result. Reference numeral 606 represents a speaker for outputting the character recognition and translation result by voice.

Figure 7A:
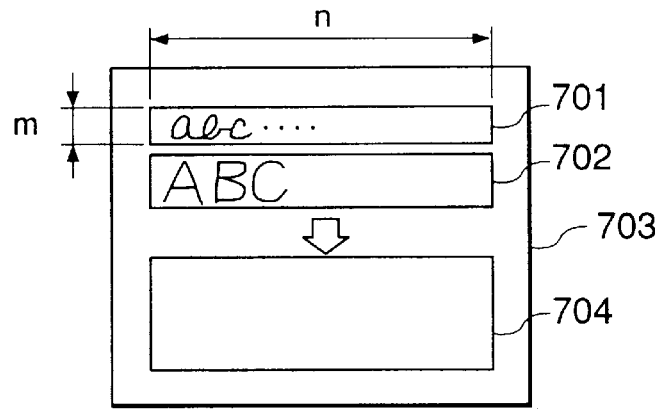
FIGS. 7A and 7B show an example of a character specifying area in the first embodiment of the present invention.
Figure 7B:
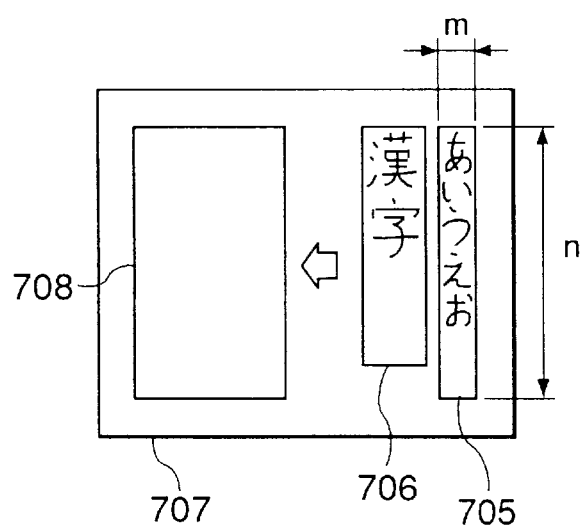

FIGS. 7A and 7B are diagrams showing a character indicating area for indicating a character array of a word or sentence for which character recognition and translation is desired.

FIG. 7A shows a character specifying method when the character array is written laterally. In FIG. 7A, reference numeral 703 represents a finder area or a display area for displaying the finder area. Both reference numerals 701 and 702 represent a character indicating area for indicating the character array of a word or sentence which are desired to be recognized and translated. Both character specifying areas 701 and 702 have a size of m×n picture elements (dots); that is, m picture elements (dots) in the height direction of the characters and n picture elements (dots) in the lateral direction of the characters. The size of each character indicating area can be independently changed. In addition, the character indicating areas 701 and 702 are independently disposed at any arbitrary position. Accordingly, the character indicating areas can be disposed at any desired positions so as to cover various characters which are written at any positions on a guide board, a building name plate, a menu of a restaurant, a sightseeing guide pamphlet or the like. In FIG. 7A, reference numeral 704 represents a translation display area for displaying a translation result of the character array of a word or sentence which are desired to be recognized and translated.

Likewise, FIG. 7B shows a character indicating method when the character array is written in the vertical direction. In FIG. 7B, reference numeral 707 represents a finder area or a display area for displaying the finder area. Both reference numerals 705 and 706 represents a character indicating area for indicating the character array of a word or sentence which is required to be recognized and translated. Like the character indicating area of FIG. 7A, both character indicating areas 705 and 706 have a size of m×n picture elements (dots), which comprises m picture elements (dots) in the lateral direction of the characters and n picture elements (dots) in the vertical direction. The size of each character indicating area can be independently changed. Furthermore, both character indicating areas 705 and 706 can be disposed at any arbitrary position. Accordingly, the character indicating areas can be disposed at any desired position so as to cover various characters which are written at any position on a guide board, a building name plate, a menu of a restaurant, a sightseeing guide pamphlet or the like. In FIG. 7B, reference numeral 708 represents a translation display area for displaying a translation result of the character array of a word or sentence which is required to be recognized and translated.

According to this embodiment, there can be provided the character recognizing and translating system for accurately recognizing and translating characters of various languages which are sensed as camera image data with no restriction in the shape or size of characters or the language. Accordingly, characters which are written on sightseeing guide boards, building name plates, signboards, pamphlets, menus of restaurants, etc. to which travelers refer in overseas travel places, can be sensed as camera image data, and be reliably recognized and translated. Therefore, a user can easily understand the meaning of the characters (sentences) as described above.

Next, a second embodiment according to the present invention will be described in detail.

FIG. 8 is a block diagram showing the construction of a voice recognizing and translating system according to a second embodiment of the present invention.

In FIG. 8, reference numeral 801 represents a recognition system for performing voice recognition, reference numeral 823 represents a study system for creating an acoustic model required for the voice recognition, and reference numeral 828 represents a translation system for receiving a recognition result from the recognition system and for analyzing voice on the basis of keywords so as to translate the voice.

Reference numeral 802 represents a directional microphone, and reference numeral 803 represents a multi-directional microphone. These microphones are provided to detect various voices which are announced in an air port, in a train station, in an airplane, in a vehicle such as a bus, a subway, a taxi or the like, in a building at a sightseeing place, etc., as well as surrounding conversation speech, voices at lectures, etc.

In the second embodiment, both the directional microphone 802 and the multidirectional microphone 803 are provided, and the directional microphone 802 is used to reliably collect a particular desired voice (target voice), while the multidirectional microphone 803 is used to collect the overall ambient sound (various sounds containing surrounding voices and noise) at any arbitrary recording place. Accordingly, the characteristic of each microphone can be individually most effectively used. However, only one microphone may be used or plural microphones may be used. That is, the number of microphones being used is not limited. Further, the type of microphone to be used may be limited to either one of the directional microphone or the multidirectional microphone.

Reference numeral 839 represents a display comprising an LCD (light emitting diode) or the like, and reference numeral 840 represents a sound output means such as a speaker, an ear-phone or the like. The display 839 and the sound output means 840 serve to output the processing result of the translation system 828 as an image containing a sentence(s) and a voice containing a sentence(s) respectively.

In the recognition system 801, reference numeral 804 represents an A/D (analog-to-digital converter for converting analog signals from the directional microphone 802 to digital signals, and reference numeral 806 represents digital data of an announcement voice which is a target voice and converted by the A/D converter 804.

According to this embodiment, the digital data 806 of the announcement voice is composed of (i.e., expressed with) 16 bits, and contain noise data at various places. Reference numeral 805 represents an A/D converter for converting analog signals from the multidirectional microphone 803 to digital signals. Reference numeral 807 represents digital data of the overall sound which is converted by the A/D converter 80 and contains noise when there is no announcement voice. In this embodiment, the digital data 807 of the overall ambient sound at various places is composed of (i.e., expressed with) 16 bits.

Reference numeral 808 represents a voice recorder for digitally recording the digital data 806 of the announcement voice which is converted by the A/D converter 804 and the digital data 807 of the overall sound at various places which are converted by the A/D converter 805 when no announcement voice is given, and storing these data into a memory 809. The digital data 806 of the announcement voice and the digital data 807 of the overall sound at various places when there is no announcement voice are stored into the memory 809 so that these data can be read out from and written into the memory in parallel. Reference numeral 810 represents the digital data of the announcement voice which is read out from the memory 809 by the voice recorder 808, and reference numeral 811 represents the digital data of the overall sound at various places which are read out from the memory 809 by the voice recorder 808 when there is no announcement voice.

Reference numeral 812 represents a noise deletion unit for receiving the digital data 810 of the announcement voice and the digital data 811 of the overall sound at various places when no announcement voice is given, and for removing noise from the digital data 810 of the announcement voice which contain noise. Reference numeral 813 represents the digital data of the announcement voice which are obtained by removing the noise from the digital data 810 of the announcement voice containing the noise in the noise deletion unit 812. In this process, the noise cannot be perfectly removed, but it is reduced because the announcement voice is relatively emphasized.

According to this embodiment, the system is designed so that the type of noise is recognized and it is used as a key to recognize announcement voices or surrounding voices under a noisy environment at various places as described later. This aspect of the system design facilitates the searching operation of an acoustic mode for acoustic collation so as to perform the voice recognition.

Reference numeral 814 represents data containing both the digital data 813 of the announcement voice which are obtained by removing the noise from the digital data 810 of the announcement voice containing the noise in the noise deletion unit 812, and the digital data 811 of the overall sound at various places when no announcement voice is given, which are directly output from the noise deletion unit 812.

Reference numeral 815 represents a sound analysis unit for performing sound feature extraction processing on the digital data 813 of the announcement voice from which the noise has been removed, by using a short-time frequency analysis. Reference numeral 816 represents a section detector for detecting a voice-existing section on the basis of the input waveform of the voice. Reference numeral 817 represents an acoustic collating unit for collating the input voice through a link unit with an acoustic model for a recognition target in an acoustic model storing unit 819, a dictionary 820 and a grammar dictionary 821. The collation result of the acoustic collating unit 817 is output as a recognition result of a word or sentence in a continuous voice from a judging unit 818. Reference numeral 827 represents coded data representing a word or sentence, which are output as a recognition result of the word or sentence in a continuous voice in the judging unit 818.

In the study system 823, the digital data of the announcement voice obtained by removing the noise from the digital data 810 of the announcement voice containing noise, and the digital data of the overall sound at various places when there is no announcement voice, are stored in a large-scale announcement sound data base 824. A sound analysis unit 825 reads out the data stored in the large-scale announcement sound data base 824, and subjects the read-out data to sound feature extraction processing based on the short-time frequency analysis. The model learning unit 826 receives the sound feature extraction result from the sound analysis unit 825 to create an acoustic model. Here, the acoustic model is a reference model which is a criterion for the voice recognition, and it has a model for every unit such as a consonant, a vowel or the like of a phoneme. For example, the Hidden Markov Model (HMM) is used as such a model.

The created acoustic model is associated with (or linked to) a code representing a word or sentence with the assistance of an operator who is familiar with the collected or detected language, and a necessary part thereof is stored in the acoustic model storing unit 819. At this time, the created acoustic model is also associated with a noise environment code at data collecting places when no announcement voice is given, and stored in the acoustic model storing unit 819. In the sound analysis unit 825, the noise environment code is created on the basis of the digital data of the overall sound at various places when there is no announcement voice.

In this embodiment, plural acoustic models under different noise environments are created for a code representing a word or a sentence. Preferably, plural acoustic models are created in accordance with a dialect of the language to be translated or the like.

In the translation system 828, the coded data 827 representing a word or a sentence which are output from the recognition system 801 is analyzed by a keyword analysis unit 829 as to whether the data provide a keyword which is effective for translation, and the meaning of a sentence is recognized on the basis of the keyword. Further, the medium language processor 832 generates a medium language representing only the meaning of the sentence which is not dependent on any particular language.

The keyword analysis unit 829 is connected to a word meaning dictionary (dictionary for word) 830 and a sentence structure meaning dictionary (dictionary for sentence) 831. For example, when an input announcement voice is in German and it is required to be translated into Japanese, the acoustic model storing unit 819, the dictionary 820 and the grammar dictionary 821 in the recognition system 801 and the dictionary for word 830 and the dictionary for sentence 831 in the translation system 828 are designed to correspond to the German language. Further, in order to use this system in a multilingual mode, an exchangeable large-capacity storing medium such as an IC card, a CD-ROM or the like is preferably used for the acoustic model storing unit 819, the dictionary 820, the grammar dictionary 821, the dictionary for word 830 and the dictionary for sentence 831.

The sentence of the medium language which is generated in the medium language processor 832 is translated into a sentence of a desired language in a sentence formation unit 833. The sentence formation unit 833 is connected to a dictionary 834 and a sentence structure example dictionary (dictionary for sentences) 835 which are designed to correspond to, e.g., Japanese. The translated sentence is displayed on the screen of the display 839. The translated sentence is further converted to a digital voice in the sound synthesis processor 837, passed through a D/A converter 838 for converting digital signals to analog signals, and then output as a voice from the sound output means 840.

The sound synthesis processor 837 is connected to the dictionary for sentences 835 and a sound dictionary 836 which are designed to correspond to, e.g., Japanese. Furthermore, in order to use this system in a multilingual mode, an exchangeable large-capacity storing medium such as an IC card, a CD-ROM or the like is preferably used for the dictionary 834, the dictionary for sentences 835 and the sound dictionary 836.

Each processing block of FIG. 8 may be composed of a system comprising plural LSIs and memories, or one or more system-on-chips formed on a semiconductor device.

Next, a voice recognition operation and an actual situation when the voice recognizing and translation system of this embodiment is applied to a portable translating machine, will be described hereunder.

Figure 9:
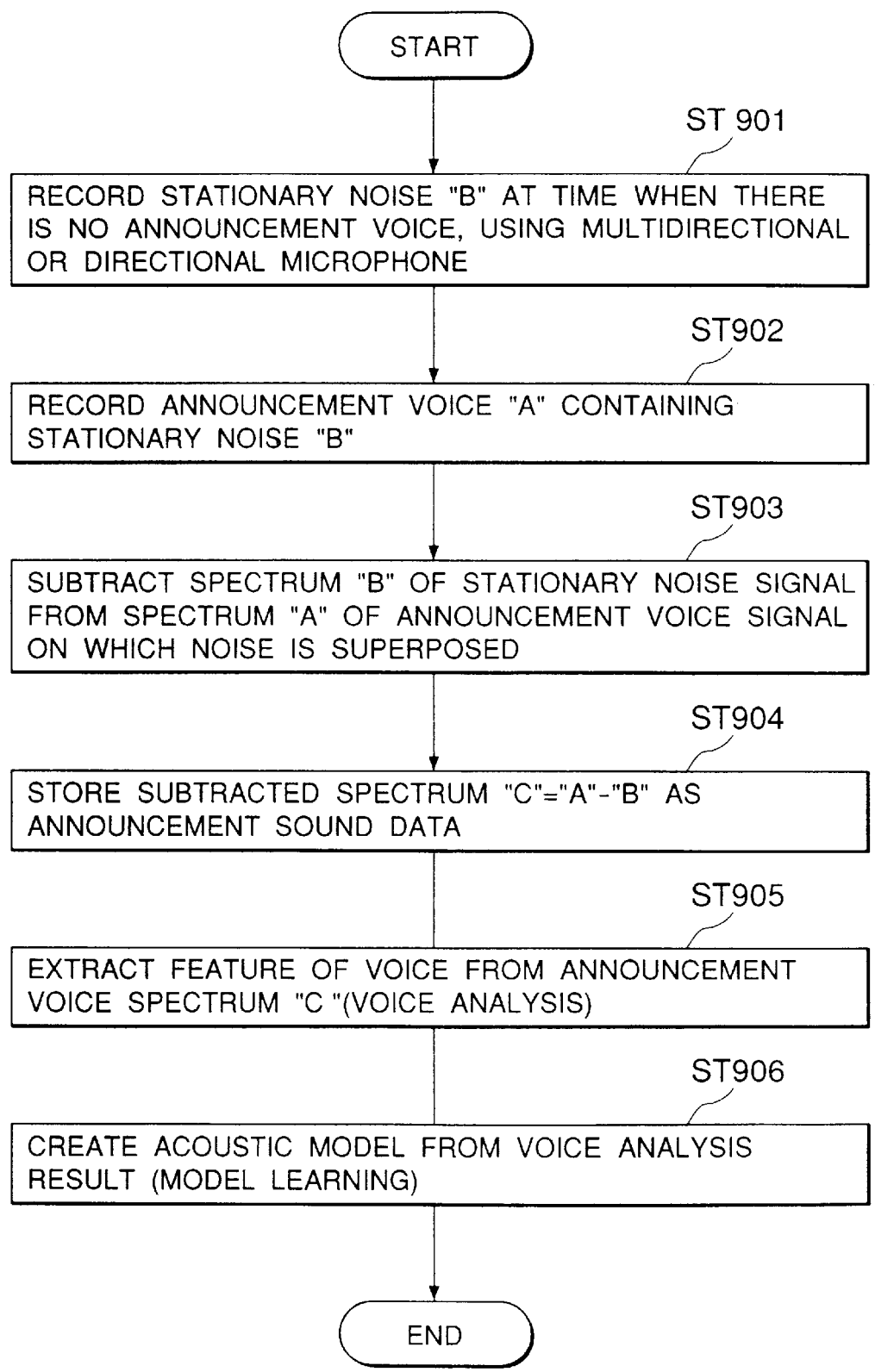
FIG. 9 is a flowchart for generating an acoustic model in the second embodiment of the present invention.

FIG. 9 is a flowchart illustrating the application of a portable translating machine during overseas travel to detect in advance surrounding voices and announcements (announcement voices) with the portable translating machine in an overseas air port, a train station or the like, in a vehicle such as an airplane, a bus, a subway, a taxi or the like, or in a sightseeing building, and previously creating acoustic models required for performing the translation of announcement voices.

First, by using the multidirectional microphone 803 or the directional microphone 802 mounted on the portable translating machine, stationary noise "B" at an arbitrary place is recorded at a time when no announcement voice is given (step ST901). Subsequently, an announcement voice "A" when an announcement is actually in progress is recorded by the directional microphone 802, for example (step ST902). The announcement voice "A" contains substantially the same background noise as the previously-recorded noise "B". Subsequently, the noise deletion unit 812 subtracts the spectrum "B" of the signal representing the stationary noise from the spectrum "A" of the announcement voice signal on which the noise is superposed (step ST903). Subsequently, a spectrum "C" is obtained by subtraction (i.e., spectrum "C"=spectrum"A"−spectrum"B"), and is stored as announcement voice spectral data into a large-scale announcement sound data base 824, and in connection with these data, the spectral data of stationary noise "B" are also stored into the large-scale announcement sound data base 824 (step ST904). The sound analysis unit 825 performs the short-time frequency analysis on the stored announcement voice spectrum "C" to perform the sound feature extraction (sound analysis), and also to analyze the noise environment (step ST905). Finally, the model learning unit 826 creates an acoustic model on the basis of the voice analysis result (model learning), associates the created acoustic model with a code representing a word or a sentence, and then stores it into the acoustic model storing unit 819 (step ST906).

Figure 10:
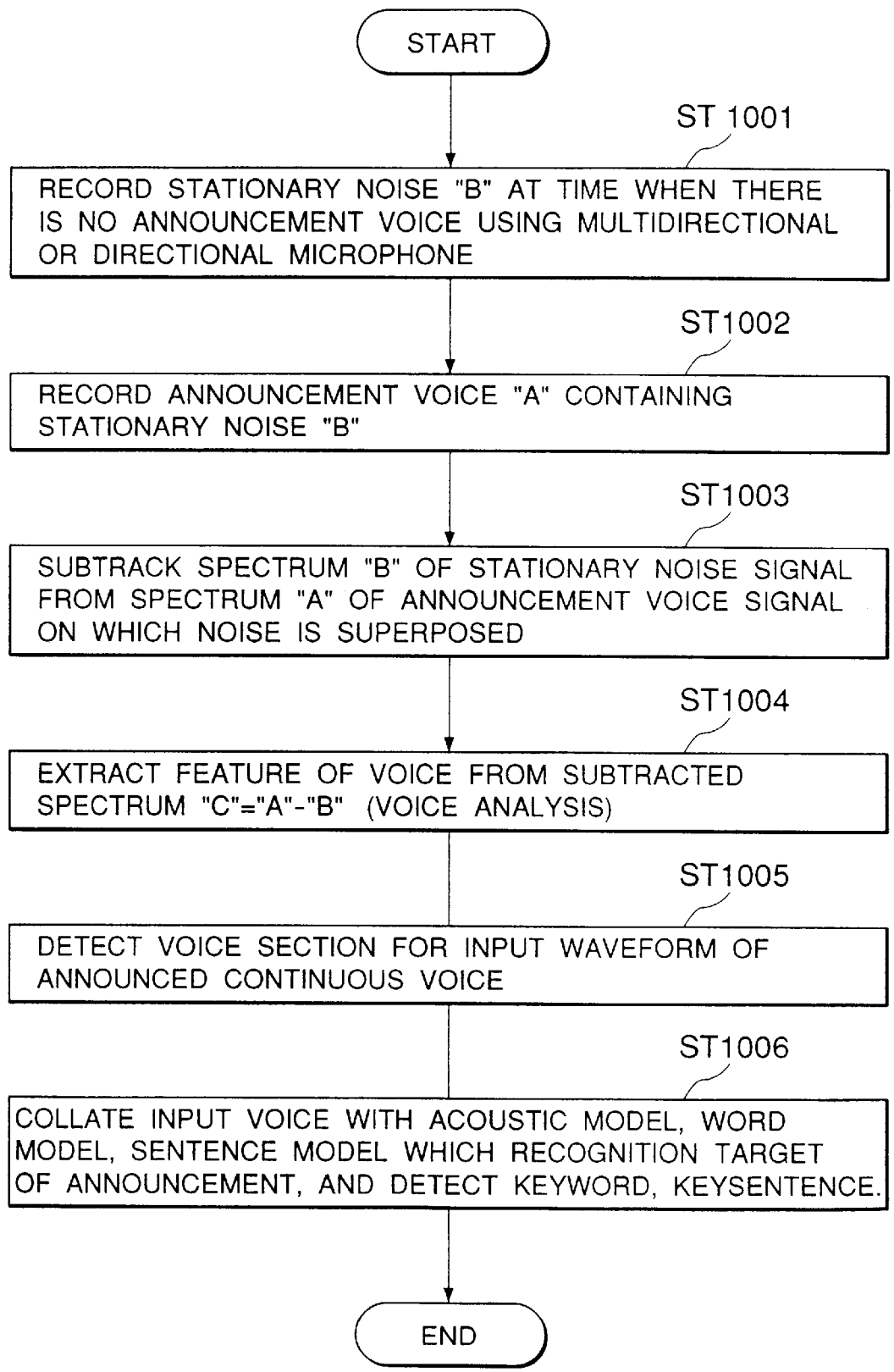
FIG. 10 is a flowchart for announced voice recognition in the second embodiment of the present invention.

FIG. 10 is a flowchart showing a series of processes in which the portable translating machine with which a traveler travels overseas performs the voice recognition on an announcement voices to which the traveler listens in an air port or a train station, in a vehicle such as an airplane, a bus, a subway, a taxi or the like, or in a sightseeing building.

It is assumed that the traveler does not understand the meaning of an announcement made in an air port or a train station, in a vehicle such as an airplane, a bus, a subway, a taxi or the like, or in a sightseeing building. However, he can easily judge from the reaction of fellow listeners that the announcement would be something of interest to him. At this time, the traveler turns on a switch of the portable translating machine, and the stationary (i.e., background ambient) noise "B" at various places at a time when there is no announcement voice is recorded through the multidirectional microphone or the directional microphone mounted on the portable translating machine (step ST1001). Subsequently, when the announcement of interest actually starts, an announcement voice "A" containing substantially the same noise as the previously-recorded stationary noise "B" is recorded through the directional microphone 802, for example (step ST1002).

Subsequently, the noise deletion unit 812 subtracts the spectrum "B" of the stationary noise signal from the spectrum "A" of the announcement voice signal intermixed with the noise (step ST1003). Thereafter, the short-time frequency analysis is performed on the spectrum "C" thus obtained by the subtraction operation (i.e., spectrum "C"=spectrum"A"−spectrum"B") to perform the sound feature extraction (sound analysis) (step ST1004). Thereafter, a section in which the desired voice exists is detected on the basis of the input waveform of the continuous announcement voice (step ST1005). Finally, the input voice is collated with the acoustic model of an announcement recognition target and a model of a word or a sentence so as to detect a keyword or a keysentence.

Figure 11:
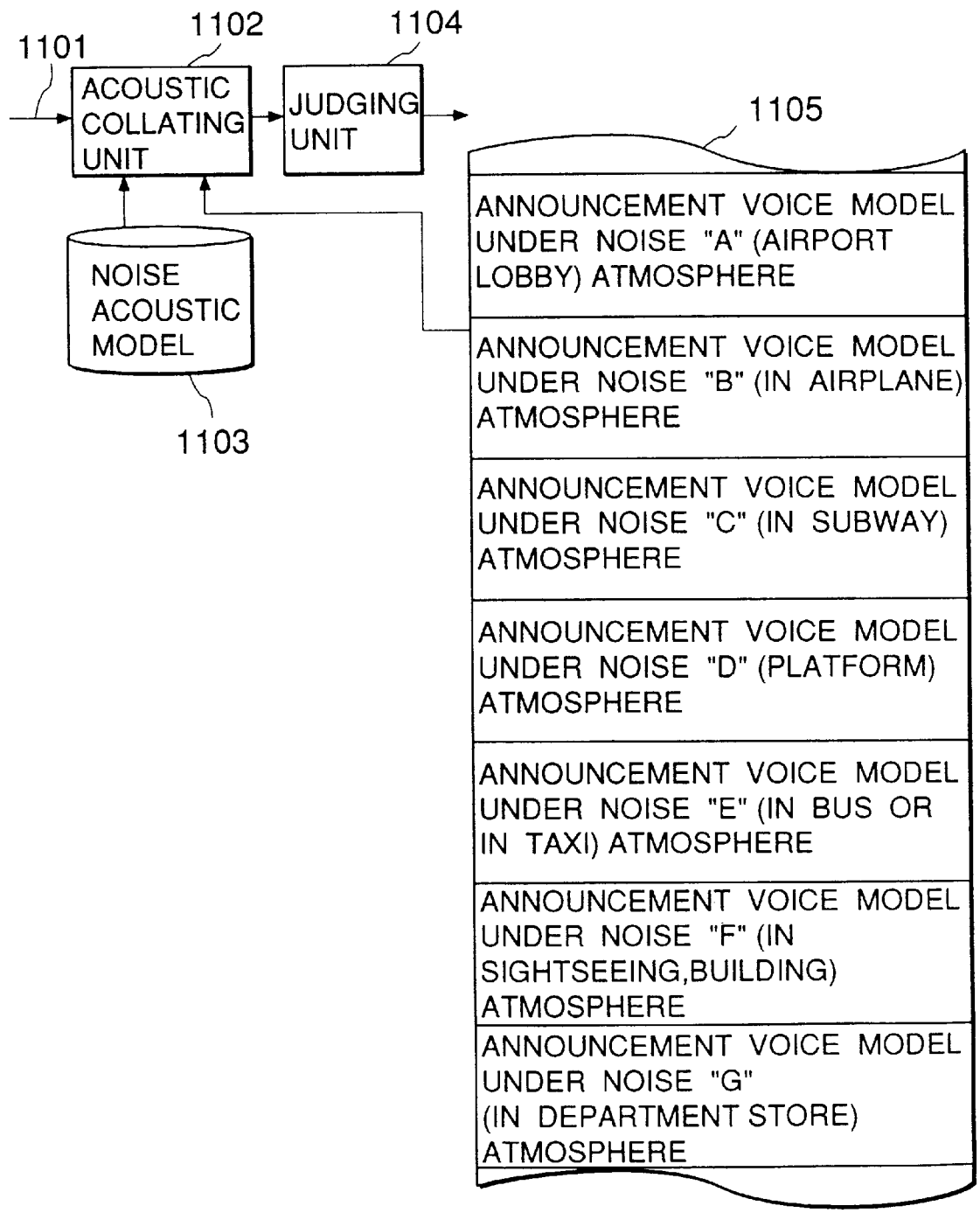
FIG. 11 is a diagram showing the announced voice recognition according to a noisy environment in the second embodiment.

FIG. 11 is a diagram showing that an acoustic model can be easily searched in an acoustic collating process for the digital data 813 of an announcement voice which is obtained by removing noise from the digital data 810 of an announcement voice containing the noise.

As mentioned previously, the overall noise is not perfectly removed from the digital data of the announcement voice which has been subjected to the noise removing process. However, in this process the noise is relatively reduced because the announcement voice is relatively emphasized. Accordingly, if the type of noise (noise environment) can be recognized, it is possible to perform the voice recognition of an announcement voice under a noisy environment at various places.

In FIG. 11, reference numeral 1101 represents the digital data of an announcement voice from which noise is removed, reference numeral 1102 represents an acoustic collating unit for performing acoustic collation, reference numeral 1103 represents an acoustic mode of the noise, reference numeral 1104 represents a judging unit, and reference numeral 1105 represents an announcement acoustic model which is learned and stored in accordance with every noise environment code. In the constituent elements of FIG. 11, the noise acoustic model 1103 and the announcement voice model 1105 are contained in the acoustic model storing unit 819 of FIG. 8. Further, the acoustic collating unit 1102 and the judging unit 1104 correspond to the acoustic collating unit 817 and the judging unit 818 of FIG. 8, respectively.

In this embodiment, as described above, the stationary (i.e., background ambient) noise "B" when no announcement voice is given is recorded by the multidirectional or directional microphone mounted on the portable translating machine before detecting a target voice to be translated (in this case, an announcement voice) (see step ST1001 of FIG. 10). At this time, in the acoustic collating unit 1102, the noise "B" is collated with various models stored in the noise acoustic model 1103 to recognize a place (noise environment) where the noise "B" is generated. This recognition is performed by identifying a noise environment code which is added to each of the noise acoustic models. Subsequently, the announcement voice "A" containing the stationary noise "B" is recorded, subjected to predetermined processing and then collated with an announcement voice model under the noise environment corresponding to the identified environment code. As described above, only the announcement voice model corresponding to the recognized noise environment code is searched and then the announcement voice is collated with the searched model, so that the search operation can be easily and quickly performed. For example, when the noise "B" is the background ambient noise in a subway, it is sufficient for the acoustic collating unit 1104 to search only the announcement voice models under an "in-subway" noise environment.

Figure 12A:
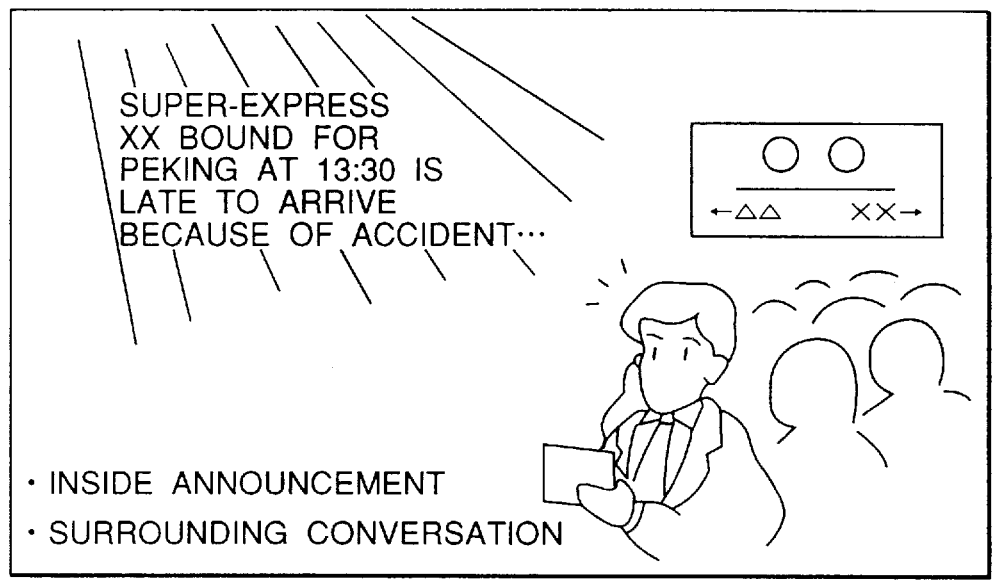
FIGS. 12A and 12B are diagrams showing a portable translating machine to which the voice recognizing and translating system of the second embodiment.
Figure 12B:
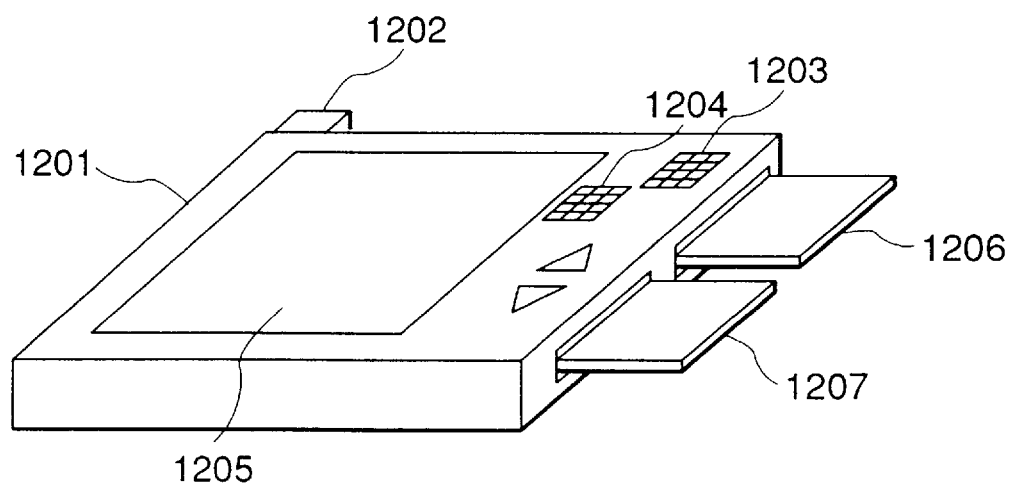

FIGS. 12A and 12B are diagrams showing a situation where the portable translating machine is used, and an example of the external view of the portable translating machine respectively. More specifically, FIG. 12A shows a situation where a guide announcement is made with voice in a train station. A user who is a traveler can recognize the translation content of the announcement through the display and the sound output means of the portable translating machine. When the user wishes to translate the announcement to, for example, Japanese, because he is a Japanese person, the announcement will be translated into Japanese.

FIG. 12B shows the external view of the portable translating machine. In FIG. 12B, reference numeral 1201 represents the main body of the portable translating machine, and reference numeral 1202 represents a directional microphone for detecting, as an analog signal, a voice which is announced in an air port or a train station, in a vehicle such as an airplane, a bus, a subway, a taxi or the like or in a sightseeing building, in a surrounding conversation speech or a voice which is spoken at a lecture place. Reference numeral 1203 represents a multidirectional microphone which is used to remove surrounding (i.e., background ambient) noise from a voice which is announced in an-air port or train station, in a vehicle such as an airplane, a bus, a subway, a taxi or the like or in a sightseeing building, in a surrounding conversation speech or a voice which is spoken at a lecture place, and for detecting the overall sound at that place when there is no target voice. Reference numeral 1204 represents a sound output unit for outputting the translated voice so that a user may hear it, and it comprises a speaker or ear-phone. Reference numeral 1205 represents a display for displaying the content of the voice-translation result. Reference numeral 1206 represents an IC card in which the acoustic model storing unit 819, the dictionary 820, the grammar dictionary 821, the dictionary for word 830 and the dictionary for sentence 831 for the voice recognition and translation are installed. Reference numeral 1207 represents an IC card in which the dictionary 834, the dictionary for sentences 835 and the sound dictionary 836 for the voice recognition and translation are installed.

Figure 13:
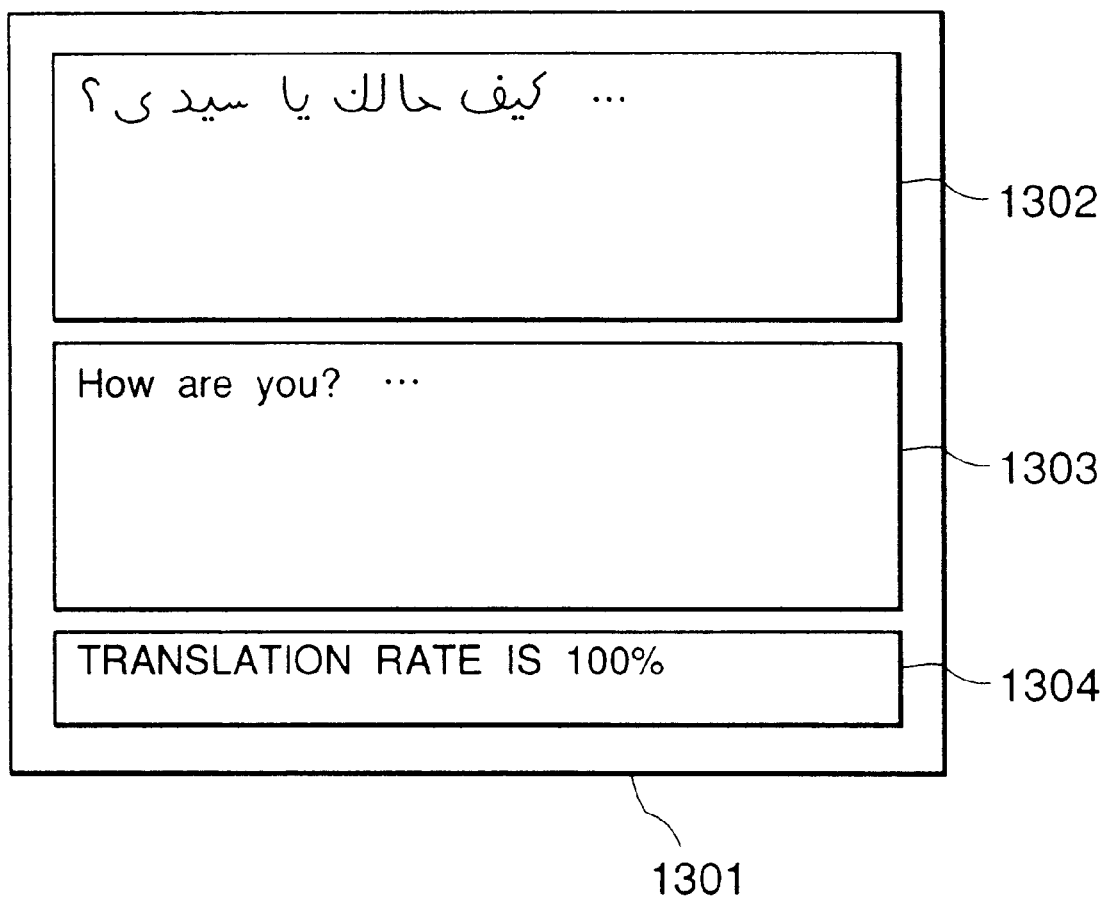
FIG. 13 is a diagram showing a display on the screen of the display in the portable translating machine shown in FIG. 12B.

FIG. 13 is an example of a display content which is obtained through the voice recognition and translation by the portable recognizing and translating machine. In FIG. 13, reference numeral 1301 presents a display area of the portable translating machine. A voice recognizing result which is obtained by recognizing a voice which is announced in an air port or train station, in a vehicle such as an airplane, a bus, a subway, a taxi or the like or in a sightseeing building, in a surrounding conversation speech, or a voice which is spoken at a lecture place and directly expressing the recognized voice in the native language of the user is displayed in a character style on a partial area 1302 of the display area 1301. Further, a translation result is displayed in a character style on a partial area 1303. In this case, for example, an Arabic voice is translated into an English word or sentence. In addition, a partial area 1304 is provided to the display area 1301 to display information on the translation such as a probability of the translation, a translation success rate or the like. In this case, the translation success rate is displayed on the partial area 1304. In addition to the translation success rate, information on the type of original language before the translation may be displayed on the partial area 1304.

According to this embodiment, there can be provided a voice recognizing and translation system which is suitable for use in recognizing and translating a voice which is announced in an air port or train station, in a vehicle such as an airplane, a bus, a subway, a taxi or the like or in a sightseeing building, in a surrounding conversation speech, or a voice which is spoken at a lecture place.

The present invention is not limited to the above embodiments, and various modifications may be made by those skilled in the art within the scope of the subject matter as distinctly pointed out and claimed in the claims. It is needless to say that any such modifications thus made are encompassed by the present invention.

For example, in the first invention, the character (document) recognizing and translating system comprises the recognition system 101, the study system 102 and the translation system 103. However, the recognition system 101 and the translation system 103 may be mounted on a compact device such as a portable translating machine while the study system 102 may be mounted on a device having a relatively large-capacity storage device such as a personal computer or the like. In this case, the personal computer and the portable translating machine are connected to each other, and the recognition system and the study system are actuated to supply the data from the mask learning unit 117 of the study system 102 to the sample mask storing unit 111 of the recognition system 101. Accordingly, the necessary data are stored in the sample mask storing unit 111 of the recognition system 101, whereby the portable translating machine may be freely used. Alternatively, the personal computer may be provided with at least the character data base 115 while the other constituent elements are provided to the portable translating machine which may be detachably connected to the personal computer.

Furthermore, in the second embodiment, the voice recognizing and translating system comprises the recognition system 801, the study system 823 and the translation system 828. Of these elements, the recognition system 801 and the translation system 828 may be provided to a compact-size device such as a portable translating machine while the study system 823 is provided to a relatively large-capacity storing device such as a personal computer. In this case, the personal computer and the portable translating machine are connected to each other, and the recognition system 801 and the study system 823 are actuated so as to supply the data from the model learning unit 826 of the study system 823 to the acoustic model storing unit 819 of the recognition system 101. Accordingly, the required data are stored in the acoustic model storing unit 819 of the recognition system 801, whereby the portable translating machine may be freely used. Alternatively, at least the sound data base 824 may be provided to the personal computer while the other constituent parts may be provided to the portable translating machine which is detachably connected to the personal computer.

Furthermore, in this specification, "means" does not necessarily mean a physical means, but it may comprise software which achieves the function of each means. Further, the function of one means or member may be achieved by two or more physical means or members, or the functions of two or more means or members may be achieved by one means or member.

What is claimed is:

1. A character recognizing and translating system for recognizing characters contained in a sensed image and translating words or sentences which are composed of the recognized characters, comprising:

a character data base for accumulating character data representing the characters contained in the sensed image;

a character shape analysis unit for analyzing the shape of each character on the basis of the character data in the character data base and extracting features of character constituent elements constituting the character;

a mask learning unit for generating sample mask data of the character constituent elements on the basis of a result of analysis of said character shape analysis unit;

a character collating unit for collating character data of a character serving as a recognition target which is contained in the sensed image which is newly sensed, with the sample mask data of the character constituting elements to recognize words or sentences of more than one language;

a judging unit for judging which one of the more than one language the words or sentences which are recognized by the character collating unit are formed in; and a translation unit for translating the words or sentences.

2. The character recognizing and translating system as claimed in claim 1, wherein said character recognizing and translating system comprises a stationary-mount-type information equipment having an external storage device, and a portable-type information equipment which is detachably connected to said stationary-mount-type information equipment, and wherein said character data base, said character shape analysis unit and said mask learning unit are provided to said stationary-mount information equipment, said external storage device contains said character data base, and all remaining constituent elements are provided to said portable information equipment.

3. The character recognizing and translating system as claimed in claim 1, wherein said character shape analysis unit divides out binary data of m×n dots from the character data in said character data base and detects "1" or "0" for each picture element while incrementing n to divide the character data into picture-element areas of m×n1 (n1≦n), m×n2 (n2≦n), . . . , m×ni (ni≦n) containing features of the character and analyze an attribute representing a weighting coefficient which represents an identification of the character, and/or the start, link and end of the character.

4. The character recognizing and translating system as claimed in claim 3, wherein said mask learning unit adds each picture-element area m×n1 (n1≦n), m×n2 (n2≦n), . . . , m×ni (ni≦n) containing the features of the character with the attribute representing the weighting coefficient which represents the identification of the character (i.e., represents what the character concerned is), and/or the start, link and end of the character to generate sample mask data.

5. The character recognizing and translating system as claimed in claim 4, wherein said character collating unit divides out binary data of m×n dots from the character data in said character data base and detects "1" or "0" for each picture element while incrementing n to divide the character data into picture-element areas of m×n1 (n1≦n), m×n2 (n2≦n), . . . , m×ni (ni≦n) containing the features of the character and collates the data of the picture-element areas with the sample mask data.

6. The character recognizing and translating system as claimed in claim 4, further comprising a sample mask memory for storing the sample mask data obtained by said mask learning unit, said sample mask memory storing therein different sample mask data of n1,n2, . . . ,nj for an arbitrary character.

7. The character recognizing and translating system as claimed in claim 5, further comprising an image sensing unit for sensing an image containing characters, and a character array specifying unit for specifying a character array containing words or sentences to be recognized from the image data which are sensed by said image sensing unit.

8. The character recognizing and translating system as claimed in claim 7, wherein said character array specifying unit specifies one or more area of m×n dots at any position from the image data obtained by said image sensing unit.

9. The character recognizing and translating system as claimed in claim 8, wherein when the character array obtained by said character array specifying unit is written laterally, said character collating unit obtains the picture-element areas while incrementing n which is associated with n dots in the width direction of the characters, and collates the data of the picture-element areas with the sample mask data.

10. The character recognizing and translating system as claimed in claim 8, wherein when the character array obtained by said character array specifying unit is written vertically, said character collating unit obtains the picture-element areas while incrementing n which is associated with n dots in the height direction of the characters, and collates the data of the picture-element areas with the sample mask data.

11. The character recognizing and translating system as claimed in claim 1, further comprising an image sensing unit for sensing an image containing characters, and a character array specifying unit for specifying a character array containing words or sentences to be recognized from the image data which are sensed by said image sensing unit.

12. The character recognizing and translating system as claimed in claim 11, wherein said character array specifying unit specifies one or more area of m×n dots at any position from the image data obtained by said image sensing unit.

13. The character recognizing and translating system as claimed in claim 1, wherein said character recognizing and translating system comprises a stationary-mount-type information equipment having an external storing device, and a portable information equipment which is detachably connected to said stationary-mount-type information equipment, and where at least said character data base is provided to said external storing device of said stationary-mount-type information equipment while all remaining constituent elements are provided to said portable information equipment.

14. A character recognizing and translating system for analyzing the shape of a character contained in sensed image on the basis of character data representing the character to obtain sample mask data of character constituent elements constituting the character, recognizing on the basis of the sample mask data a character which is newly sensed for the character recognition and translation, and translating words or sentences which are composed of the recognized characters, including:

a character collating unit for collating the character data of the characters contained in the image with the sample mask data of the character constituting elements to recognize words or sentences of more than one language;

a judging unit for judging which one of the more than one language the words or sentences which are recognized by the character collating unit are formed in; and a translation unit for translating the words or sentences.

* * * * *